Figure 1:
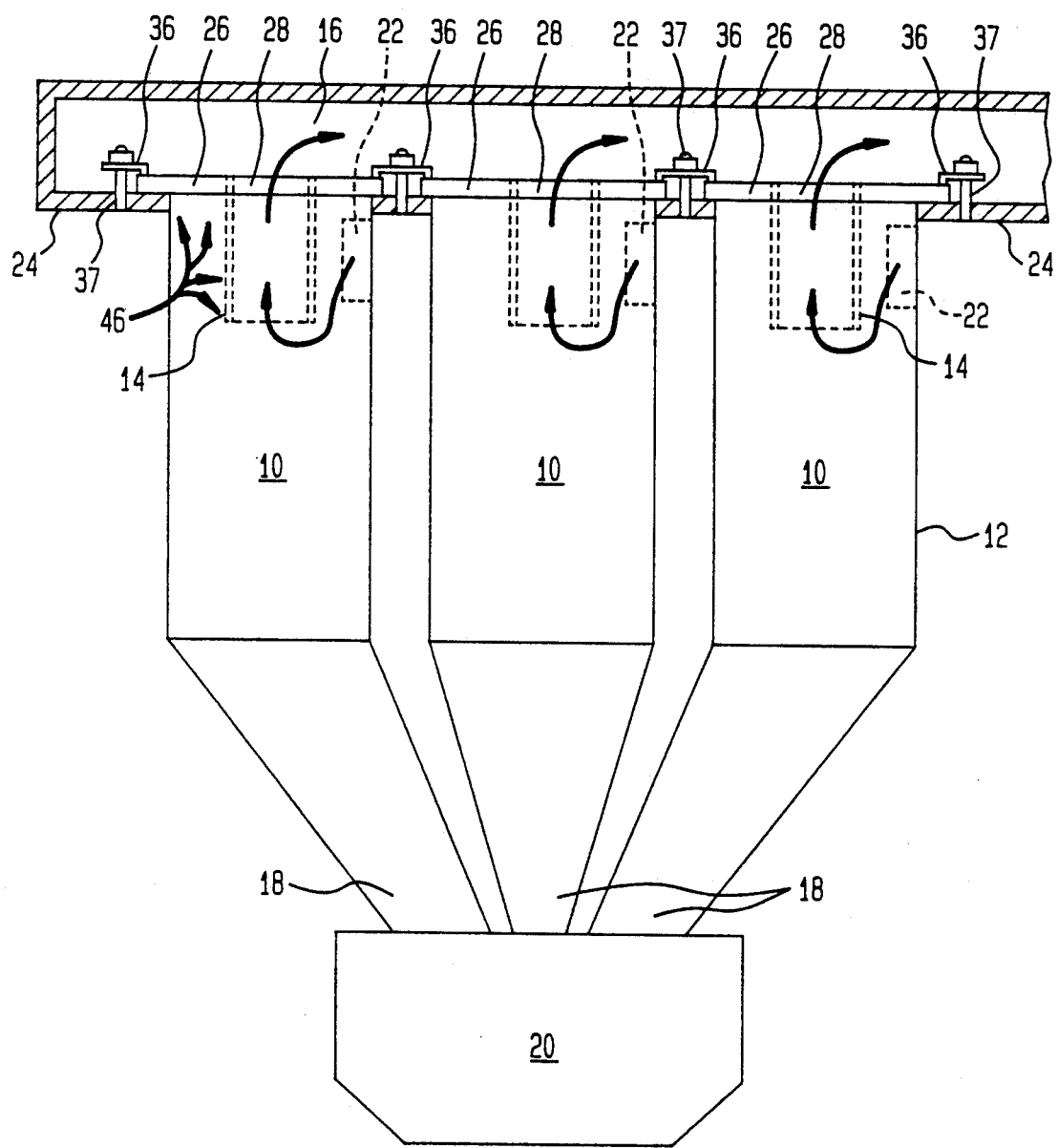

United States Patent [19]

Kramer

[11] Patent Number: 5,275,634
[45] Date of Patent: Jan. 4, 1994

[54] METHOD OF CLEANING A CYCLONE, AND CYCLONE CLEANABLE THEREWITH

[76] Inventor: Erich Kramer, Röthenstrasse 21, 8626 Michelau, Fed. Rep. of Germany

[21] Appl. No.: 849,047
[22] PCT Filed: Sep. 19, 1991
[86] PCT No.: PCT/EP91/01787
§ 371 Date: Apr. 23, 1992
§ 102(e) Date: Apr. 23, 1992
[87] PCT Pub. No.: WO92/04984
PCT Pub. Date: Apr. 2, 1992

[30] Foreign Application Priority Data

Sep. 19, 1990 [EP] European Pat. Off. ........ 90118025.7

[51] Int. Cl.⁵ .......................................... B01D 46/00
[52] U.S. Cl. ............................. 95/267; 15/316.1; 15/352; 55/302; 55/337; 55/459.1
[58] Field of Search ............... 15/316.1, 352; 55/1, 55/96, 294, 302, 337, 345, 346-

[56] References Cited

U.S. PATENT DOCUMENTS 4,859,335 8/1989 Whyte .................. 55/294 X
5,066,315 11/1991 Haberl et al. ............ 55/96

FOREIGN PATENT DOCUMENTS 0087778 9/1983 European Pat. Off. .

*Primary Examiner*—Charles Hart
*Attorney, Agent, or Firm*—Feiereisen & Kueffner

[57] ABSTRACT

A method for cleaning a cyclone which separates excess powder aspirated from a powder coating cabin, and cyclones for carrying out this cleaning method are created, with cleaning air being aspirated during the cleaning operation from the lower end of the cyclone via the cyclone interior, the immersion tube and the clean gas channel, and at least the outer surface of the immersion tube and the cyclone interior facing surface of the bottom of the clean gas channel is cleansed by means of compressed air blasts which exit from nozzles and directly impact these surfaces.

24 Claims, 7 Drawing Sheets

METHOD OF CLEANING A CYCLONE, AND CYCLONE CLEANABLE THEREWITH

The present invention refers to a method of cleaning a cyclone which separates excess powder aspirated from a powder coating cabin, and to a cyclone to be cleaned by this method.

During powder coating, there is a frequent need for a change of paint so that the coating cabin and all auxiliary aggregates which contact the powder, i.e. also the cyclones connected to the cabin must be thoroughly cleaned. As will be explained later in more detail, during operation of the cyclone powder deposits are however encountered in the area between the inner cyclone wall and the immersion tube, especially at the outside of the immersion tube and at the underside of the bottom of the clean gas channel which represents the cyclone top. These powder deposits are only insufficiently removed by the flow of cleaning air. Thus, these areas are still cleaned by hand which is difficult and time consuming and still results only in insufficient cleaning because it is hardly possible to reach all angles and corners. In order to reach this area, a door is provided in the cyclone wall. This is complicated and causes disturbances in the air flow during powder separation since these doors cannot be flush mounted in the cyclone wall. Also, after manual cleaning, it is still required to direct a flow of cleaning gas therethrough in order to remove those powder particles which drop during manual cleaning and adhere to the lower wall areas of the cyclone. Even though provision of the above-mentioned door may be avoided by parting the conical portion of the cyclone or by designing the cyclone as continuous straight cylinder and by conducting the manual cleaning from below; still this is not only very strenuous but results also in a reduced velocity of the flow of cleaning air and in an increased demand of space, especially when several adjoining cyclones should communicate at their underside with a common powder collecting container.

Therefore, it is an object of the invention to create a cleaning method for cyclones of the above-stated type by which the cyclones can be thoroughly cleansed in a relatively short time. Further, it is an object of the invention to design the cyclone such as to be suitable for carrying out the cleaning method.

The solution of the object with regard to the method is attained in accordance with the features of claim 1, while the solution of the object with regard to the apparatus is attained in accordance with the features of claims 2, 5, 8 and 11.

Figure 2:
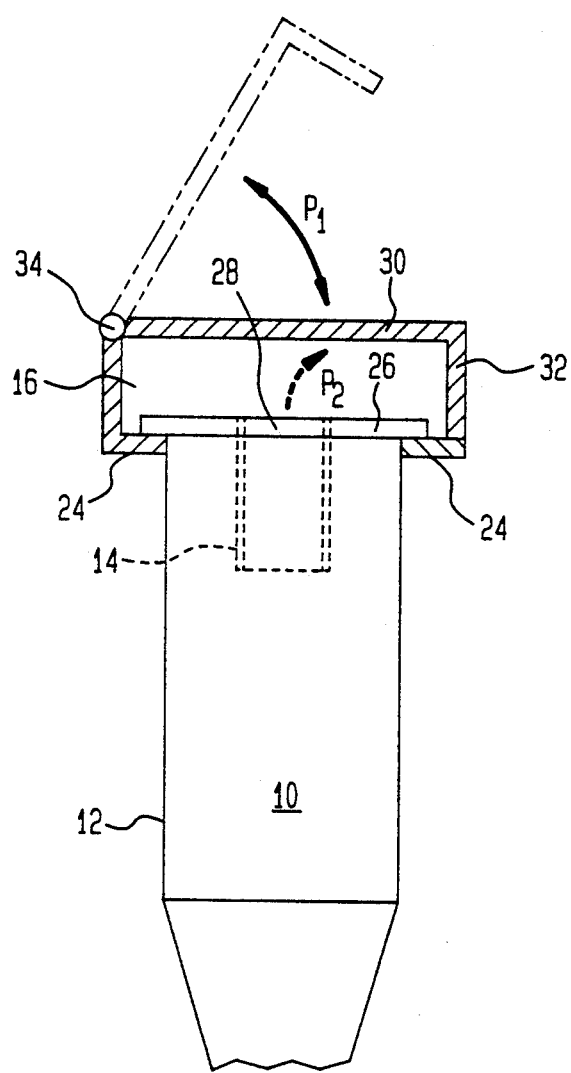
Figure 3:
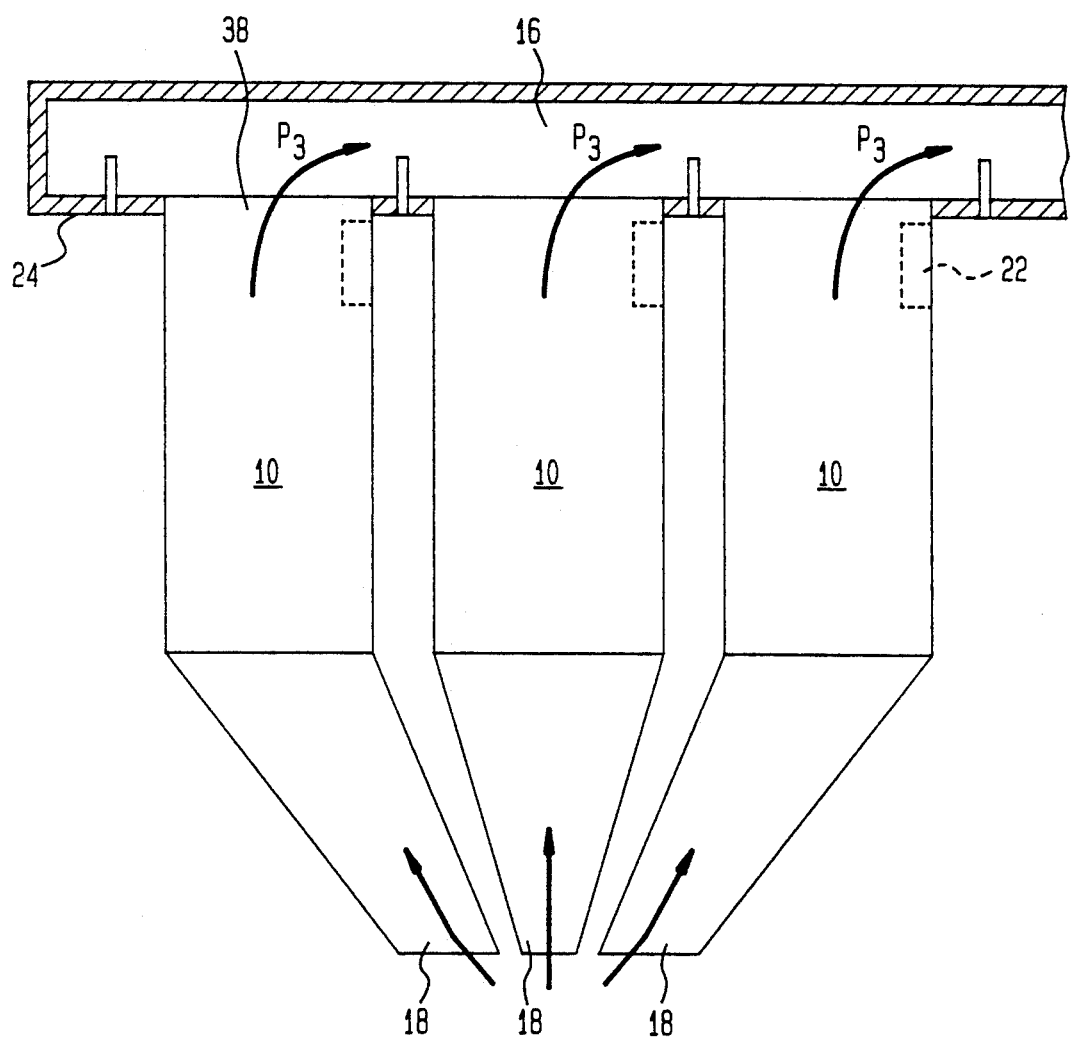
Figure 4:
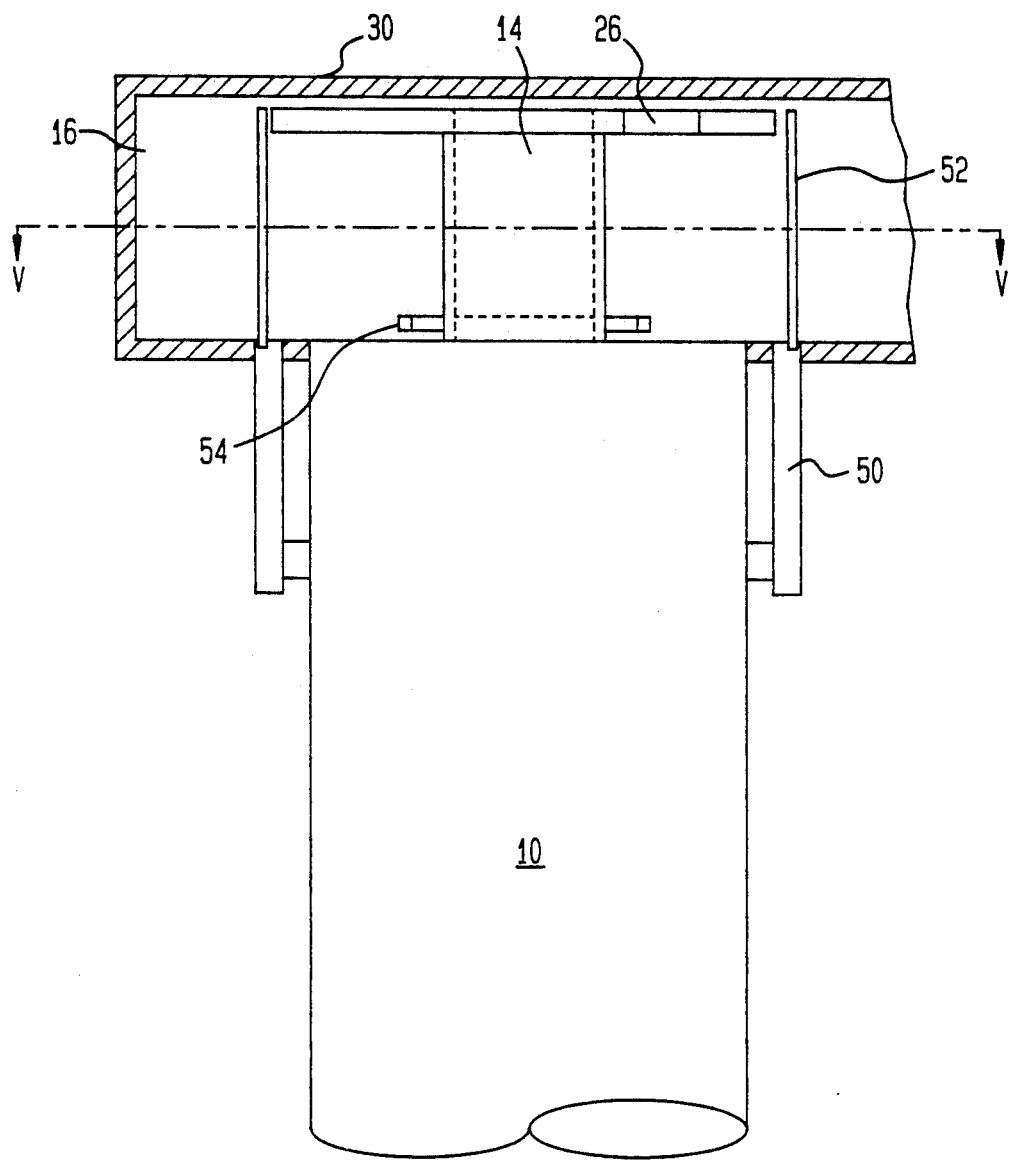
Figure 5:
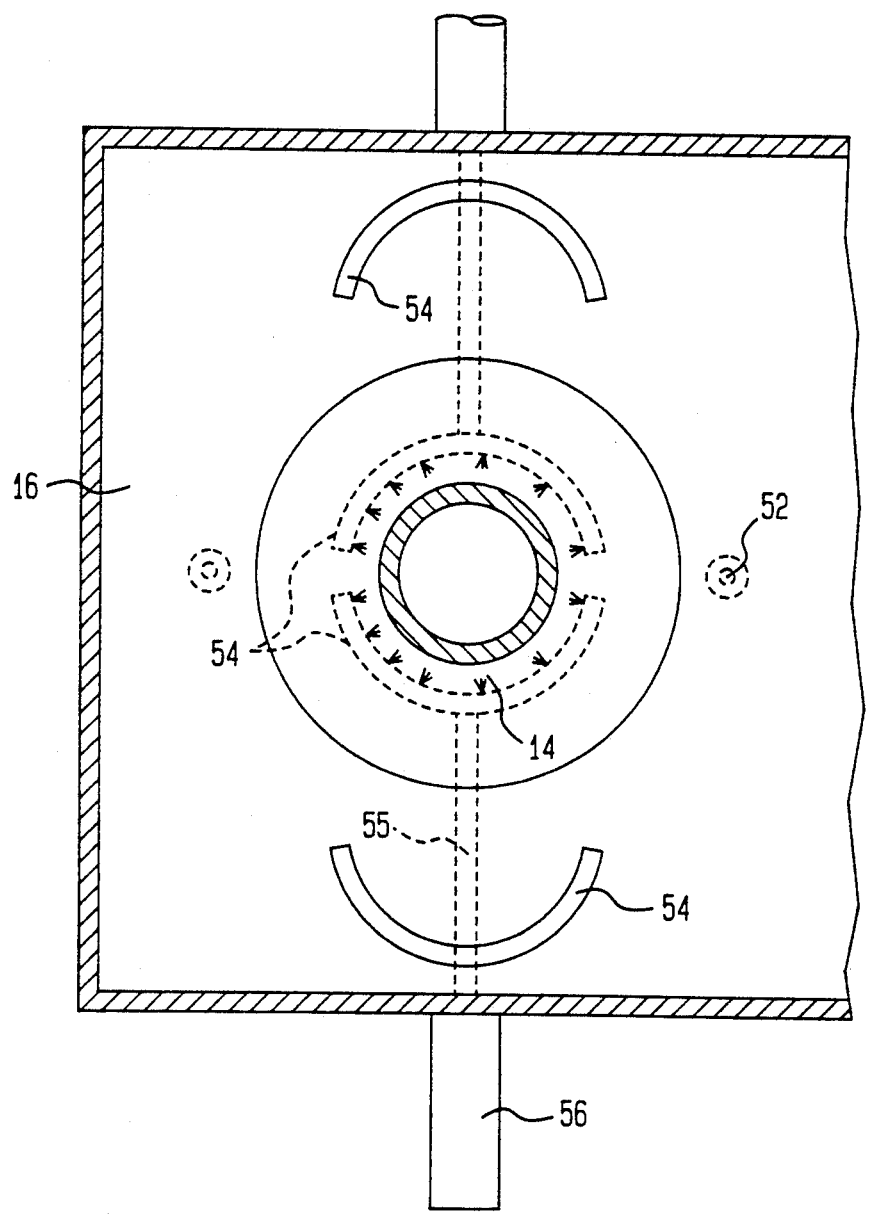
Figure 6:
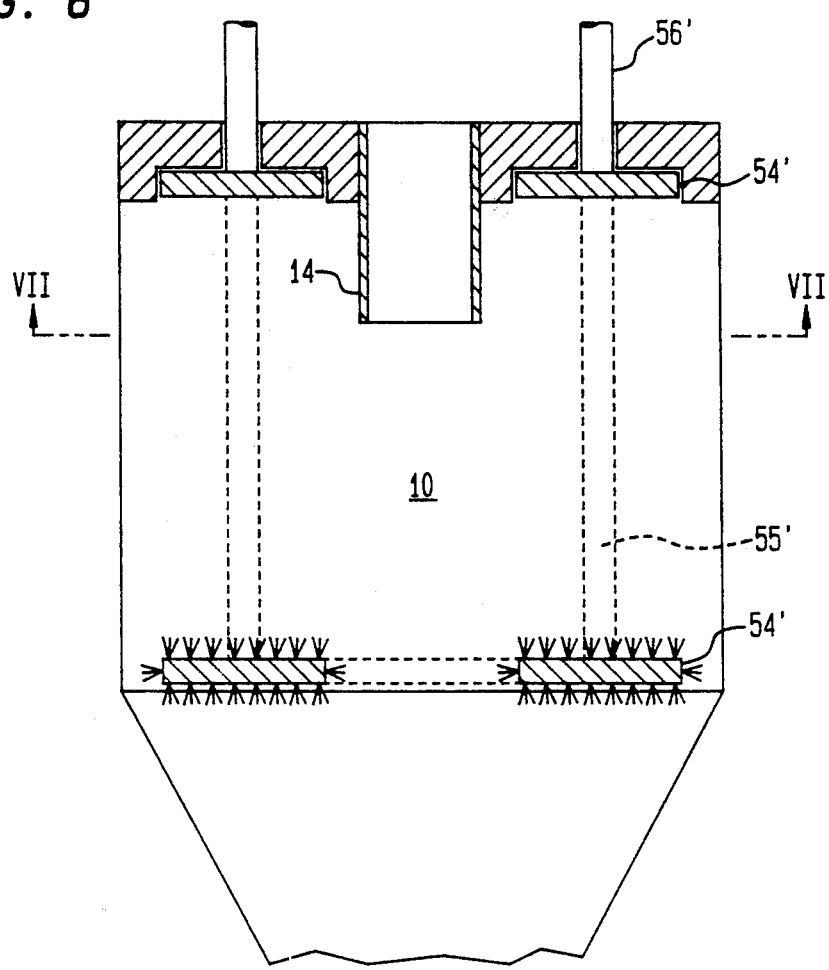
Figure 7:
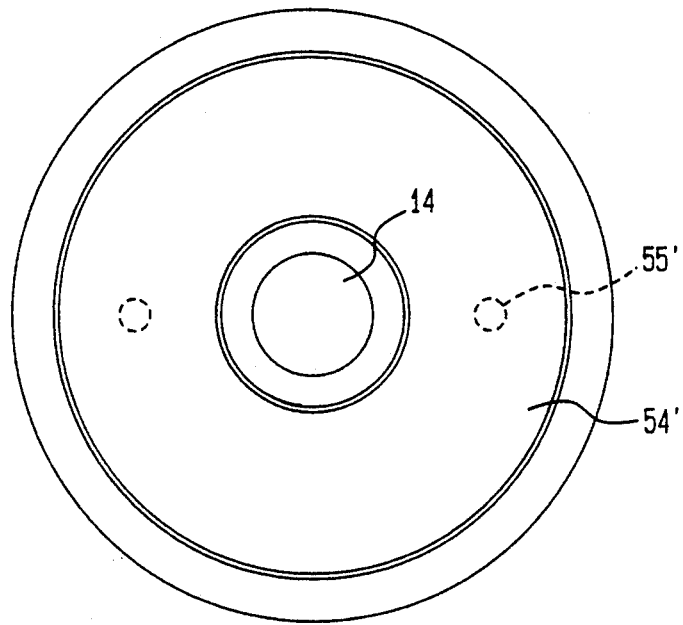
Figure 8:
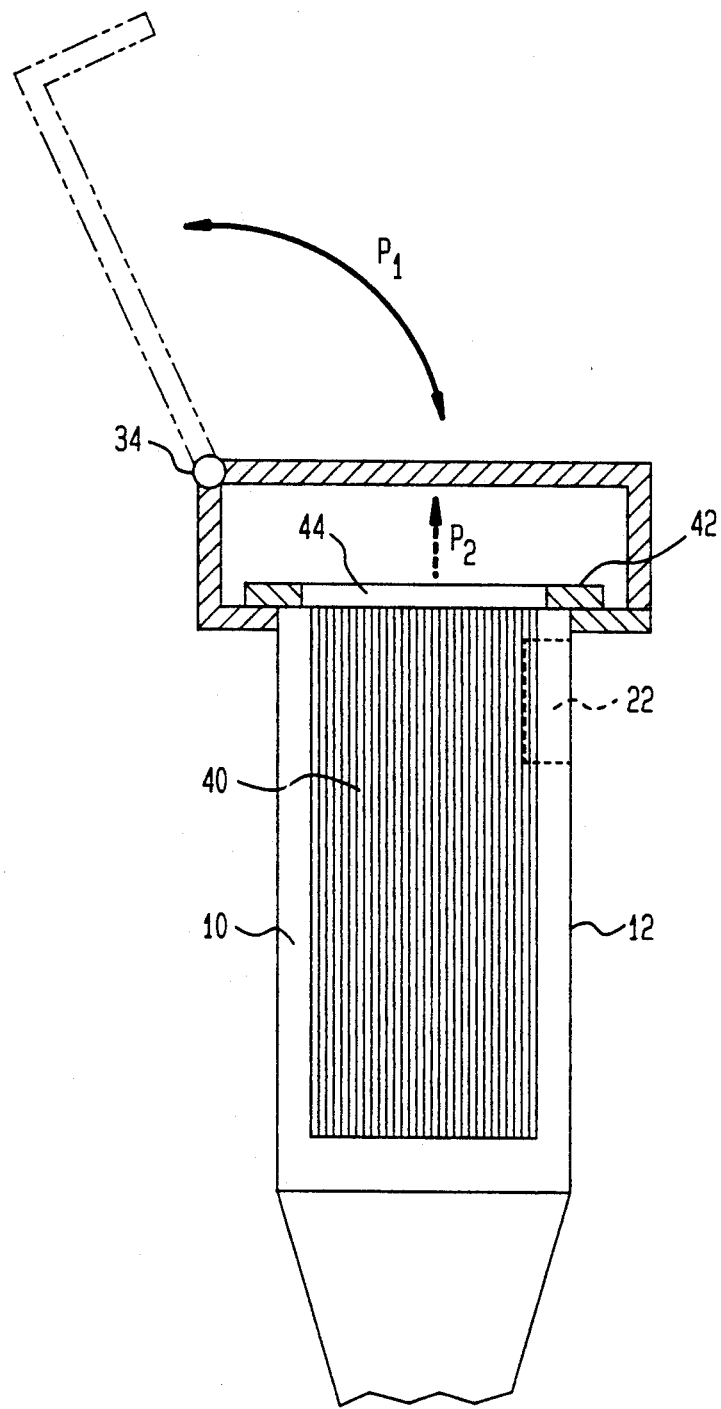

The invention will now be described in more detail with reference to the drawing in which FIG. 1 shows a vertical section of a group of three cyclones according to a first embodiment, with the cyclone being connected to a common clean gas channel and a common powder collecting chamber, FIG. 2 shows a vertical section through one of the cyclones of FIG. 1, intersected at a right angle to the drawing plane of FIG. 1, FIG. 3 shows the group of three cyclones according to FIG. 1, with the immersion tubes being removed, FIG. 4 shows a partial sectional view through the upper part of a cyclone according to a second embodiment, FIG. 5 shows a horizontal section taken along the line V—V of FIG. 4, FIG. 6 shows a vertical section through the upper part of a cyclone according to a third embodiment, FIG. 7 shows a horizontal section taken along the line VII—VII of FIG. 6, and FIG. 8 shows a sectional view of the cyclone at a right angle to the drawing plane of FIG. 1, with a filter cartridge being inserted in the cyclone for substitution of an immersion tube.

The embodiment according to FIGS. 1 to 3 constitutes—in contrast to subsequently described embodiments—only a "semi-automatic" solution, which, however, is particularly suitable to explain the basic principle of the invention and is therefore referred to at the beginning of the description.

FIG. 1 shows three adjoining cyclones 10 which are combined to a unit and are connected to one (or several) not shown powder coating cabins from which excess powder is aspirated and recovered in the cyclones 10.

Arranged at the upper end of the housing 12 of each cyclone 10 is an immersion tube 14 which extends coaxially and centrically from top to bottom within the cyclone. The upper end of each immersion tube 14 communicates with a common clean gas channel 16, with its bottom including circular disk-shaped openings 28 of a diameter corresponding to the diameter of the respective immersion tube 14. The bottom 24 of the clean gas channel 16 constitutes simultaneously the upper end or lid of the cyclones 10 so that clean gas channel and cyclones are directly connected with each other.

The lower ends 18 of the cyclones 10 are tapered and communicate with a common powder container 20 in which the powder separated in the cyclones 10 is collected.

Powder-air-mixture aspirated from the not shown powder cabin is fed to the cyclones 10 via entrance openings 22 which are arranged in the outer upper part of the cyclone and allow an essentially tangential introduction such that the introduced powder-air-flow carries out a helical motion. The lower end of the immersion tube 14 is arranged below the lower end of the entrance opening 22. This ensures that the powder-air-mixture entering through the openings 22 initially moves downwards in helical manner, with the specific weight of the powder causing the powder to drop downwards and to reach the powder container 20, whereas air freed from the powder flows upwards through the immersion tube 14 into the clean gas channel 16 and eventually into the atmosphere. The separation of the powder is supported by the fact that the mentioned flow conditions press the powder against the inside wall surface of the cyclone and comes into contact with the outer wall of the immersion tube. This mode of operation of the cyclones is known and thus requires no further explanations.

At operation of the cyclones, deposits of powder particles are inevitably encountered at the inside walls of the cyclones, especially in the areas designated at 46 in FIG. 1, but also at the outside walls of the immersion tubes 14. During a change of paint, i.e. a coating of the workpieces in the coating cabin with powder of a different color, it is therefore not only necessary, in order to be able to recover the powder separated in the cyclones, to exchange the powder container 20 but it is also necessary to thoroughly clean the cyclones 10 as otherwise undesired mixtures are obtained. During cleaning, the connection of the powder coating cabin and the respective cyclone, or respective groups of cyclones, is closed and the container 20 is removed, whereupon air is upwardly aspirated from the now open lower end of the cyclone 10 to and through the clean gas channel 16. This results in a cleansing of most of the inner wall surfaces of the cyclone 10, however, cleaning air flow still hardly or insufficiently reaches the mentioned critical areas 46 so that a subsequent manual cleaning becomes necessary to data. Therefore, conventional cyclones have been equipped with cleaning doors to allow this subsequent manual cleaning.

This conventional cleaning method of cyclones has several disadvantages. The quality of cleaning depends essentially on the particular person performing the manual cleaning. Further, during manual cleaning, the mentioned cleaning air is mainly drawn through the open cleaning door so that powder which drops downwards during cleaning can deposit in the lower inner wall area of the cyclone because the aspiration effect in this area is now only minimal. Therefore, after manual cleaning and closing of the cleaning doors, cleaning air is again passed therethrough. The period for cleaning is thus considerably increased, resulting especially during frequent change of paint to extended periods of stoppage of the coating plant. Moreover, during operation of the cyclone, foreign air is aspirated through the gaps of the cleaning door, with the gap edges causing flow disturbances at the inner cyclone wall and measurably impairing the efficiency of separation. This effect could be avoided through complicated door constructions and door making processes, however, this would considerably increase the manufacturing expenses of the cyclone.

In order to avoid these drawbacks, the bottom 24 of the clean gas channel 16 in the area of each cyclone 10 is provided with a detachable bottom section 26 of circular disk-shaped configuration, with the bottom section 26 having a diameter slightly exceeding the outer diameter of the cyclone and being clamped and sealed against the latter by means of clamping claws 36. Each clamping claw 36 is supported by a bolt which projects from the non-detachable area of the bottom 24 of the ring channel 16. The immersion tube 14 is suitably connected, for example inserted or threadably engaged or welded, with the pertaining detachable bottom section 26.

As shown in FIG. 2, each cyclone 10 is cleansed by upwardly swinging the lid 30 and a side wall 32 of the clean gas channel 16 about a horizontal axis 34, as indicated by arrow P1. The clamping claws 36 are released and the respective bottom section 26 of the clean gas channel 16 is removed from the cyclone in direction of arrow P2 together with the immersion tube 14 which is securely fixed to the bottom section 26. Subsequently, lid 30 and side wall 32 are swung back to thereby close the clean gas channel whereupon the previously shut down—not shown—aspirator is started again. As shown in FIG. 3, the cyclones are thus provided with flat through channels for the cleaning air which flows upwardly from the lower ends 18 through the cyclones and enters the clean gas channel 16 through the openings 38 and bottom 24 and continues flowing in a direction as indicated by arrows P3. This air is then guided e.g. through a filter and then released into the atmosphere. Thus, the flow path of the cleaning air in the cyclones is thus not obstructed any more by corners, edges or dead zones so that the cyclones can be quickly, reliably and unobjectionably cleaned.

After being removed from the cyclones 10, the immersion tubes 14 with their attached bottom parts 26 can be quickly an easily cleansed through blasting with compressed air outside the cyclones, for example by means of blow guns or by means of compressed air nozzles which are fixedly secured to the cyclone unit. After this cleansing, the immersion tubes with the bottom sections can be reintroduced in the cyclones which were also cleansed in the meantime so that the cyclones are again ready for use.

Apart from the exact cleaning, the advantage resides primarily in a time saving effect because the blasting of the immersion tubes with the attached bottom section is carried out at the same time as the interior of the cyclone is cleansed by means of the flow of cleaning air, so that significantly shortened stoppage phases of the plant are encountered during a change of paint compared with conventional cleaning methods as set forth above.

In case of strongly adhering or especially heavy powder particles, the cleaning of a unit comprised of several cyclones can be carried out for example by shutting down all cyclones except for one so that the entire aspirated cleaning air is drawn through this one cyclone to thereby further reinforce the cleaning effect.

FIG. 4 shows a second embodiment in which the immersion tube 14 together with the bottom section 26 can also be lifted off the cyclone 10 without requiring to open the clean gas channel. This embodiment represents a "fully automatic" solution.

As shown in FIG. 4, two diametrically opposed drive cylinders 50 are attached to the cyclone 10 and are hydraulically or pneumatically actuated, with their longitudinal axes extending parallel to the longitudinal axis of the cyclone. The extendable piston rods 52 of the drive cylinders 50 are connected at their free ends with the bottom part 26 which, for this purpose, is provided with radial pins engaging respective bores in the ends of the piston rods 52 and suitably secured, for example through screws or cotters. By means of the drive cylinders 50 and their piston rods 52, the bottom part 26 together with the immersion tube 14 can be moved from the working position as shown in FIG. 1 into the cleaning position as shown in FIG. 4. The clean gas channel 16 is sufficiently high to allow the immersion tube 14 to completely withdraw from the cyclone. In order to attain same flow conditions, it is suitable to design the clean gas channel of cap-shaped configuration with central discharge (not shown). Furthermore, two semicircular nozzle pipes 54 are provided which bear upon the free end of piston rods 55 of two further drive cylinders 56. The arrangement of the nozzle pipes 54, the piston rods 55 and the drive cylinders 56 are best seen in FIG. 5, with the nozzle pipes and the piston rods being shown in extended position as illustrated in broken lines. Thus, the nozzle pipes 54 are located directly above the bottom of the clean gas channel in a plane (horizontal plane) parallel to the bottom and are so displaceable in this plane along the mid-perpendicular relative to the—imaginary—straight line by which both piston rods 52 are connected, that the nozzle pipes 54 in their initial position as illustrated in full lines are located outside the vertically shiftable bottom part 16 and in their extended position concentrically enclose in form of an approximate closed circle the immersion tube 14 at small distance. The supply of compressed air to the nozzle pipes 54 is essentially attained via the hollow piston rods 55. The control of the piston rods 52, piston rods 55 and of the supply of compressed air to the nozzle pipes 54 is attained via a common control unit.

For cleaning purposes, the bottom part 26 and the immersion tube 14 are upwardly moved out of the cyclone 10 by means of the drive cylinders 50 and piston rods 52 and into the position illustrated in FIG. 4, i.e. either slightly below or until abutting the lid 30 of the clean gas channel 16. Simultaneously with the beginning lifting of the bottom part 26, compressed air for the nozzle pipes 54 is released and, as soon as the bottom plate 16 is lifted beyond the plane of the nozzle pipes 54, the nozzle pipes are moved by the drive cylinders 56 and their piston rods 55 into the position as shown in broken lines. Thus, during upward lift of the bottom part 16 and the immersion tube 14, an intense cleansing of these structural elements is attained which is supported, as shown in the embodiment of FIG. 1, by the cleaning air flowing from below through the cyclone interior and entering the clean gas channel. In this embodiment, it is thus not required to open the clean gas channel, and the entire cleaning process can be mechanized such that the entire process runs fully automatically, triggered for example by an electric switch acting upon magnet valves. In the latter case, there is also no difficulty to synchronize the motions and blasting actions through a program in a predetermined manner.

A further, also fully mechanized embodiment is shown in FIGS. 6 and 7. This embodiment differs from the one according to FIGS. 4 and 5 in that the immersion tube 14 and the bottom part 16 remain stationary and the nozzle pipes are displaceable within the cyclone parallel to the longitudinal cyclone axis. The nozzle pipes 54' which are mounted to the piston rods 55 have a configuration in form of semicircular rings which in their retracted position engage recesses 16' of the bottom part 16, and from this position (position shown in broken lines) are downwardly movable in vertical direction. All sides of the nozzle pipes 54' are provided with outlet nozzles. The supply of compressed air is provided for example through the piston rods 55'. During cleaning, the nozzle pipes 54' are slowly moved downwards to thereby cleanse the outer surface of the immersion tube 14 and at the same time the underside of the bottom part 16. Also in this case, the cleaning effect is supported by the flow of cleaning air directed from bottom to top, and the removed powder is discharged with this flow of cleaning air via the clean gas channel and a filter.

It is especially suitable to allow the nozzle pipes 54' to move beyond the immersion tube 14, especially to a point at which the straight cylindrical housing portion is connected to the conical housing portion, as shown in FIG. 6. In this manner, also the straight cylindrical inner wall portion of the cyclone is cleansed through compressed air blasts, which is especially advantageous when strongly adhering or even greasy powder is concerned.

In accordance with a modification of the embodiment described just now, it is feasible, especially in case of comparably short immersion tubes 14 to insert the rods 55' from both sides horizontally into the cyclone 10, in which case, the side wall of the cyclone is designed in a manner as shown in FIG. 6 for the top wall of the cyclone and bottom wall of the clean gas channel, i.e. in such a manner that both diametrically opposing nozzle pipes 54' are retracted in their initial position in the side wall of the cyclone while surrounding the immersion tube at a comparably small distance in their—here in horizontal direction—extended position. As set forth, this modification is applicable only with short immersion tubes and, moreover, it should be ensured that in the retracted position the nozzle pipes do not interfere with the separation process during operation of the cyclone.

Certainly, the embodiments of the cyclone as illustrated above can be combined with each other. It is for example possible to design the embodiment according to FIG. 4 with a foldable clean gas channel according to FIG. 2. A further possibility of combination is attained by providing the cyclone with nozzle pipes 54 according to FIG. 4 as well as with nozzle pipes 54' according to FIG. 6.

A further advantage of the invention, in particular with regard to the embodiment according to FIG. 1, is the possibility to use during powder coating also powder types which contain particles of varying specific weight, for example metallic powder. During separation within the cyclones, such powder has a tendency to segregate i.e. while the heavier particles drop downwards within the cyclone, there is the danger that the lighter particles are entrained by the suction air.

To date, for separation of such powder, separate recovery systems were used e.g. cyclones with fixedly installed filters, e.g. plate filters or cartridge filters.

By means of the invention, it is now possible to use one and the same cyclone with immersion tube as well as with filter cartridge so that standard powder as well as special powder, like for example metallic powder, can be separated by the suction air and recovered in the cyclone.

In this context, FIG. 8 shows a cyclone 10 in which a filter 40 is inserted instead of the immersion tube.

This filter is configured for example in form of a filter cartridge and is connected at its upper end with a plate 42 which has a respective through opening 44 with a diameter at least equal to the clear width of the filter 40.

Air supplied from the entrance opening 22 and laden with powder particles enters through the wall of the filter 40 and flows into the interior of the filter 40 through the opening 44 into the clean gas channel 16 and continues as known per se. The powder particles deposit at the outer wall of the filter 40.

The filter 40 is cleansed at predetermined time intervals, for example by means of a compressed air blast from a not shown compressor. Such a compressor or any other shaking device for the filter 40 can be incorporated for example in the lid or a side wall of the clean gas channel 16.

The filter 40 with the plate 42 are removed and installed in the same manner as the immersion tube 14 with the bottom section 26.

The plate 42 is clamped to the upper end of the housing 12 of the cyclone 10 by not shown claws in a same manner as the bottom section 26. For assembly and disassembly, the clean gas channel 16 is opened by swinging the lid and the side wall about the axis 34, and the filter 40 is inserted in or removed from the cyclone 10 with the plate 42 in the same manner as described in context with the immersion tube 14 with reference to FIG. 2, with plate 42 having the same function as the bottom part 26, or in other words, the plate 42, when using filter 40, constitutes the detachable bottom part of bottom 24 of the clean gas channel 16 and lid of the cyclone 10.

The invention allows a clean operation and especially a rapid change of paint. Further, it allows the use of one and the same cyclone with immersion tube as well as with filter insert so that standard powder and special powder like e.g. metallic powder which tends to segregate are treated and recovered in one and the same cyclone.

I claim:

1. Method for cleaning a cyclone which separates excess powder aspirated from a power coating cabin, with powder discharged at the lower end and cleaning air exiting via an immersion tube projecting from atop into the interior of the cyclone and being suspended from the cyclone covering bottom of a clean gas channel, with cleaning air being aspirated during cleaning operation from the lower end of the cyclone through the cyclone interior, the immersion tube and the clean gas channel, characterized in that simultaneously with the aspiration of cleaning air at least the outer surface of the immersion tube and the cyclone interior facing surface of the bottom of the clean gas channel are cleansed by means of compressed air blasts which exit from nozzles and directly impact these surfaces.

2. A cyclone for separating an air-powder mixture aspirated from a powder coating cabin, comprising:
   a housing having an upper housing portion and a conical lower housing portion connected to said upper housing portion and communicating with a container for collecting powder being separated;
   a top closure member secured to said upper housing portion and defining a clean gas channel for discharge of separated air, said closure member having a bottom being constructed so as to incorporate a detachable bottom part; and
   separation means for separating air from the air-powder mixture, said separation means communicating with said clean gas channel of said closure member and being arranged within said upper housing portion and mounted to said detachable bottom part, said bottom part together with said separation means being removable from said housing via said clean gas channel of said closure member for allowing subsequent cleansing thereof.

3. A cyclone as defined in claim 2 wherein said separation means is an immersion tube suspended from said bottom part.

4. A cyclone as defined in claim 2 wherein said separation means is a filter insert suspended from said bottom part.

5. A cyclone as defined in claim 2 wherein said closure member has a lid pivoted to said bottom so as to be outwardly swingable for allowing said bottom part together with said separation means to be removable from said housing via said clean gas channel of said closure member for subsequent cleansing.

6. A cyclone as defined in claim 2 wherein said upper housing portion has an opening, said detachable bottom part having dimensions at least equal to the opening of said upper housing portion.

7. A cyclone as defined in claim 2, and further comprising fastening means for detachably securing said bottom part to said bottom.

8. A cyclone as defined in claim 3 wherein said immersion tube is plunged onto said bottom part.

9. A cyclone as defined in claim 3 wherein said immersion tube is bolted with said bottom part.

10. A cyclone as defined in claim 3 wherein said immersion tube is welded to said bottom part.

11. A cyclone as defined in claim 3, and further comprising displacement means operatively connected to said bottom part for moving said bottom part together with said immersion tube into said clean gas channel of said closure member; and injection means disposed within said clean gas channel of said closure member for introducing cleaning air.

12. A cyclone as defined in claim 11 wherein said displacement means is a hydraulically operated displacement means.

13. A cyclone as defined in claim 11 wherein said displacement means is a pneumatically operated displacement means.

14. A cyclone as defined in claim 11 wherein said displacement means is a spring operated displacement means.

15. A cyclone as defined in claim 1 wherein said injection means includes compressed air nozzles arranged in the clean gas channel.

16. A cyclone as defined in claim 1 wherein said displacement means is attached to said housing and includes a cylinder/piston arrangement having piston rods mounted to said detachable bottom part, said injection means comprising a nozzle pipe arranged in the clean gas channel and provided with compressed air nozzles, and a cylinder/piston arrangement arranged in said clean gas channel and having piston rods connected to said nozzle pipes for shifting said nozzle pipes with its nozzles in direction of said immersion tube.

17. A cyclone as defined in claim 16 wherein said immersion tube defines an axis, said cylinder/piston arrangement of said injection means shifts said nozzle pipe in a direction perpendicular to said axis.

18. A cyclone as defined in claim 16 wherein said nozzle pipe is of semicircular configuration.

19. A cyclone for separating an air-powder mixture aspirated from a powder coating cabin, comprising:
   a housing having an upper housing portion and a conical lower housing portion connected to said upper housing portion and communicating with a container for collecting powder being separated;
   a top closure member secured to said upper housing portion, said closure member defining a clean gas channel for discharge of separated air and having a bottom;
   an immersion tube communicating with said clean gas channel of said closure member for guiding air being separated from the air-powder mixture into said clean gas channel, said immersion tube being mounted within said upper housing portion to said bottom of said closure member;
   injection means disposed in a retracted position within said clean gas channel of said closure member for introduction of cleaning air; and
   displacement means operatively connected to said injection means for moving said injection means from the retracted position in parallel relationship to said immersion tube.

20. A cyclone as defined in claim 19 wherein said displacement means is a hydraulically operated displacement means.

21. A cyclone as defined in claim 19 wherein said displacement means is a pneumatically operated displacement means.

22. A cyclone as defined in claim 19 wherein said bottom of said closure member has a recess, said injection means being disposed in the retracted position in said recess of said bottom.

23. A cyclone as defined in claim 19 wherein said closure member has a side wall provided with a recess, said injection means being disposed in the retracted position in said recess of said side wall.

24. A cyclone as defined in claim 19 wherein said displacement means shifts said injection means from the retracted position downwards past said immersion tube towards a plane at the junction of the upper housing portion with said conical lower housing portion.

* * * * *